(12) United States Patent
Ohno et al.

(10) Patent No.: US 11,795,068 B2
(45) Date of Patent: Oct. 24, 2023

(54) WATER PURIFICATION APPARATUS AND WATER PURIFICATION METHOD USING LAYERED DOUBLE HYDROXIDE

(71) Applicant: JDC Corporation, Tokyo (JP)

(72) Inventors: Mutsuhiro Ohno, Tokyo (JP); Yutaka Kobayashi, Tokyo (JP); Takeo Asakura, Tokyo (JP)

(73) Assignee: JDC Corporation, Tokyo (JP)

( * ) Notice: Subject to any disclaimer, the term of this patent is extended or adjusted under 35 U.S.C. 154(b) by 1106 days.

(21) Appl. No.: 16/473,931

(22) PCT Filed: Dec. 27, 2017

(86) PCT No.: PCT/JP2017/046943
§ 371 (c)(1),
(2) Date: Sep. 11, 2019

(87) PCT Pub. No.: WO2018/124190
PCT Pub. Date: Jul. 5, 2018

(65) Prior Publication Data
US 2021/0147260 A1    May 20, 2021

(30) Foreign Application Priority Data

Dec. 27, 2016  (JP) .................... 2016-253376

(51) Int. Cl.
*C02F 1/28*     (2023.01)
*C02F 101/10*   (2006.01)
*C02F 101/20*   (2006.01)

(52) U.S. Cl.
CPC .............. *C02F 1/288* (2013.01); *C02F 1/281* (2013.01); *C02F 2101/103* (2013.01); *C02F 2101/203* (2013.01); *C02F 2101/206* (2013.01)

(58) Field of Classification Search
CPC .... C02F 1/288; C02F 1/281; C02F 2101/103; C02F 2101/203; C02F 2101/206;
(Continued)

(56) References Cited

U.S. PATENT DOCUMENTS 5,378,367 A * 1/1995 O'Neill ................... C02F 1/283
                                                             210/691
5,635,063 A * 6/1997 Rajan ....................... C02F 1/42
                                                             210/283
(Continued)

FOREIGN PATENT DOCUMENTS

JP    H02-253842 A    10/1990
JP    H11-128742 A     5/1999
(Continued)

OTHER PUBLICATIONS

JP2005306667A_YAMAZAKI_translated.pdf (Year: 2004).*
(Continued)

*Primary Examiner* — Ekandra S. Miller-Cruz
(74) *Attorney, Agent, or Firm* — Young Basile Hanlon & MacFarlane, P.C.

(57) ABSTRACT

A water purification apparatus and a water purification method capable of effectively using a layered double hydroxide and easily being applied are described. A water purification apparatus for removing a polluted substance from polluted water includes a solid-liquid separator that separates the polluted water and a solid material from each other, and a polluted substance remover that removes, by a layered double hydroxide, the polluted substance contained in the polluted water separated by the solid-liquid separator.

18 Claims, 4 Drawing Sheets

(58) Field of Classification Search
CPC ............ C02F 2101/106; C02F 2101/22; C02F 1/283; B01J 20/041; B01J 20/20; B01J 20/28007; B01J 20/28052; B01J 20/28059; B01J 20/3007; B01J 20/3035; B01J 20/3085; B01J 20/06; B01J 20/08; C01F 7/00; C01G 49/00
USPC ........................................................ 210/688
See application file for complete search history.

(56) References Cited

U.S. PATENT DOCUMENTS

| | | | | |
|---|---|---|---|---|
| 6,818,130 | B1* | 11/2004 | Varriale | B01D 39/2017 210/243 |
| 7,122,116 | B2* | 10/2006 | Hackett | C02F 9/00 210/259 |
| 2006/0070952 | A1* | 4/2006 | Jin | C02F 1/288 210/764 |
| 2008/0217234 | A1* | 9/2008 | Sumida | C02F 9/00 210/667 |
| 2009/0101555 | A1* | 4/2009 | Scarpine | C02F 1/004 210/170.03 |
| 2010/0075847 | A1* | 3/2010 | Asakura | C01F 7/785 423/420.2 |
| 2015/0083662 | A1* | 3/2015 | Thomson | C02F 3/006 210/150 |

FOREIGN PATENT DOCUMENTS

| | | | | |
|---|---|---|---|---|
| JP | 2005-306667 | A | | 11/2005 |
| JP | 2013-075261 | A | | 4/2013 |
| JP | 2013085977 | A | * | 5/2013 ............ B01D 61/10 |
| JP | 2014-142264 | A | | 8/2014 |
| JP | 2016-047791 | A | | 4/2016 |

OTHER PUBLICATIONS hydrotalcite_mineral_data_publishing_NPL.pdf (Year: 2005).*
compact_definition_NPL.pdf (Year: 2022).*
Translation of JP2013085977A (Year: 2013).*

* cited by examiner

WATER PURIFICATION APPARATUS AND WATER PURIFICATION METHOD USING LAYERED DOUBLE HYDROXIDE

CROSS REFERENCE TO RELATED APPLICATION(S)

This application claims priority to Japanese Patent Application No. 2016-253376, filed Dec. 27, 2016, which is herein incorporated by reference in its entirety.

TECHNICAL FIELD

The present disclosure relates to a water purification apparatus and a water purification method using the layered double hydroxide.

BACKGROUND

Layered double hydroxide that is a kind of layered cray minerals present in nature has a host framework that is the hydroxide of an element present plentifully in nature, such as magnesium, and aluminum, and the synthesis thereof is relatively easy. Hence, various synthesis schemes have been disclosed. For example, a scheme of utilizing magnesium hydroxide as a magnesium source, and producing a layered double hydroxide in an aqueous solution (see, e.g., JP H06-329410 A), and a scheme of causing magnesium ions to react with aluminum ions in an aqueous solution under the presence of alkali (see, e.g., JP 2003-26418 A) have been disclosed.

In addition, it is known that layered double hydroxide has an anion exchange performance. Still further, if anion-based hazardous substances, such as arsenic, fluorine, selenium, hexavalent chrome, and nitrous acid ions, are immobilized by such anion exchange performance, in the safeness improving technologies for waste materials and detoxified environment improving technologies, any contributions to improvement of the water quality of polluted water, prevention of an ejection of hazardous substances, improvement of a soil, and promotion of the stabilization of hazardous substances at a waste repository are expected.

In particular, at an area where underground water polluted by arsenic is utilized as life water, a development of the water purification technology for polluted water by arsenic is desired. In addition, there is a strong demand to provide a low-cost but high-performance water purification apparatus that has a high user-friendliness and a long sustainability.

BRIEF SUMMARY

In this case, as for the conventional water purification technologies for polluted water by arsenic, a coprecipitation scheme, a reverse osmosis scheme, an ion exchange resin scheme, and an adsorption scheme to an iron-based adsorbent are known, but those technologies have various technical problems. For example, the coprecipitation scheme utilizes iron, activated alumina, cerium hydroxide, etc., but sludges are produced by aggregation and precipitation. Hence, a process for those sludges and back flushing are necessary at a constant cycle, thus not user-friendly. In addition, the reverse osmosis scheme and the ion exchange resin scheme have an excellent process performance, but need a pre-preparation and a post-preparation like pH adjustment, and high-level maintenance, such as cleansing and desorption and revitalization, and the costs are high. Still further, according to the scheme that utilizes an iron-based adsorbent, in general, a device becomes heavy, needs pre-preparation and post-preparation like pH adjustment, and also needs a maintenance like cleansing.

Accordingly, an object of the present invention is to provide a water purification apparatus and a water purification method capable of effectively using a layered double hydroxide and easily being applied.

In order to accomplish the above object, according to an aspect to the present invention, there is provided a water purification apparatus for removing a polluted substance from polluted water, the apparatus including: a solid-liquid separator that separates the polluted water and a solid material from each other; and a polluted substance remover that removes, by a layered double hydroxide, the polluted substance contained in the polluted water separated by the solid-liquid separator.

Here, the solid-liquid separator separates the solid material that decreases polluted substance adsorption performance of the layered double hydroxide.

In this case, preferably, the solid-liquid separator includes a filtration filter that has a function as a catalyst which precipitates at least one of iron, arsenic, and manganese from the polluted water.

Preferably, the solid-liquid separator is a ceramic filter or a polypropylene filter.

In addition, preferably, the polluted substance is arsenic, and the polluted substance remover removes the arsenic.

Moreover, preferably, the layered double hydroxide is a grain that is produced by applying a predetermined pressure to a material containing the layered double hydroxide and water to eliminate moisture until a water content ratio becomes equal to or lower than 70%, and thereafter, drying the material under a condition at which a temperature is equal to or higher than 90° C. but equal to or lower than 110° C., and a humidity is equal to or higher than 90%. In this case, preferably, the grain has the water content ratio that is equal to or higher than 10%. Moreover, for example, a diameter of the grain may be equal to or greater than 0.24 mm.

In addition, preferably, the layered double hydroxide is a compact obtained by molding a layered double hydroxide.

Moreover, preferably, the layered double hydroxide has a general expression that is expressed as $M^{2+}_{1-x}M^{3+}_x(OH)_2(A^{n-})_{x/n} \cdot mH_2O$ (where $M^{2+}$ is $Mg^{2+}$ or $Fe^{2+}$, $M^{3+}$ is $Al^{3+}$ or $Fe^{3+}$, $A^{n-}$ is an n-valence anion, $0<x<1$, and $m>0$).

In addition, preferably, the layered double hydroxide has a crystallite size of equal to or smaller than 20 nm.

Moreover, preferably, the polluted substance remover has a filter material that removes a component which is not absorbed by the layered double hydroxide.

In addition, according to another aspect of the present invention, there is provided a water purification method for removing a polluted substance from polluted water, the method including: a solid-liquid separation step of separating the polluted water and a solid material from each other; a polluted water supplying step of supplying the polluted water separated in the solid-liquid separation step to a layered double hydroxide; and a polluted substance removing step of removing the polluted substance containing the polluted water supplied in the polluted water supplying step, by the layered double hydroxide.

Here, the solid-liquid separation step is a step of separating the solid material that decreases polluted substance adsorption performance of the layered double hydroxide.

In this case, preferably, the solid-liquid separation step is performed using a filtration filter that has a function as a catalyst which precipitates at least one of iron, arsenic, and manganese from the polluted water.

Preferably, the solid-liquid separation step is performed using a ceramic filter or a polypropylene filter.

In addition, preferably, the polluted substance is arsenic, and the polluted substance removing step is a step of removing the arsenic.

Moreover, preferably, the layered double hydroxide is a grain that is produced by applying a predetermined pressure to a material containing the layered double hydroxide and water to eliminate moisture until a water content ratio becomes equal to or lower than 70%, and thereafter, drying the material under a condition at which a temperature is equal to or higher than 90° C. but equal to or lower than 110° C., and a humidity is equal to or higher than 90%. In this case, preferably, the grain has the water content ratio that is equal to or higher than 10%. In addition, for example, a diameter of the grain may be equal to or greater than 0.24 mm.

Moreover, preferably, the layered double hydroxide is a compact obtained by molding a layered double hydroxide.

In addition, preferably, the layered double hydroxide has a general expression that is expressed as $M^{2+}_{1-x}M^{3+}_x(OH)_2(A^{n-})_{x/n} \cdot mH_2O$ (where $M^{2+}$ is $Mg^{2+}$ or $Fe^{2+}$, $M^{3+}$ is $Al^{3+}$ or $Fe^{3+}$, $A^{n-}$ is an n-valence anion, $0<x<1$, and $m>0$).

Moreover, preferably, the layered double hydroxide has a crystallite size of equal to or smaller than 20 nm.

In addition, preferably, the water purification method further includes a polluted substance removal assistance step of removing a component which is not absorbed by the layered double hydroxide at least either before or after the polluted substance removing step.

According to the present invention, it is possible to provide a water purification apparatus and a water purification method capable of effectively using a layered double hydroxide and easily being applied.

In addition, also provided are a water purification apparatus and a water purification method which are easy to apply, and which have a high polluted substance removal effect at low costs.

DETAILED DESCRIPTION

First of all, an explanation will be given of a layered double hydroxide according to the present disclosure.

The layered double hydroxide is an indeterminate compound that has a general expression expressed as $M^{2+}_{1-x}M^{3+}_x(OH)_2(A^{n-})_{x/n} \cdot mH_2O$ (where $M^{2+}$ is a divalent metal ion, $M^{3+}$ is a trivalent metal ion, $A^{n-}$ is an n-valence anion, and $0<x<1$, and $m>0$), and is often called a hydrotalcite-like compound. Example divalent metal ions ($M^{2+}$) are $Mg^{2+}$, $Fe^{2+}$, $Zn^{2+}$, $Ca^{2+}$, $Li^{2+}$, $Ni^{2+}$, $Co^{2+}$, and $Cu^{2+}$. In addition, example trivalent metal ions ($M^{3+}$) are $Al^{3+}$, $Fe^{3+}$, $Cr^{3+}$, and $Mn^{3+}$. Still further, example anions ($A^{n-}$) are $ClO_4^-$, $CO_3^{2-}$, $HCO_3^-$, $PO_4^{3-}$, $SO_4^{2-}$, $SiO_4^{4-}$, $OH^-$, $Cl^-$, $NO_2^-$, and $NO_3^-$.

The layered double hydroxide according to the present disclosure may contain any divalent metal ions ($M^{2+}$), trivalent metal ions ($M^{3+}$), and anion ions ($A^{n-}$). For example, the layered double hydroxide may be $Mg^{2+}_{1-x}Al^{3+}_x(OH)_2(A^{n-})_{x/n} \cdot mH_2O$ (Mg—Al type) that has $Mg^{2+}$ which is the divalent metal ion ($M^{2+}$), and has $Al^{3+}$ which is the trivalent metal ion ($M^{3+}$), $Mg^{2+}_{1-x}Fe^{3+}_x(OH)_2(A^{n-})_{x/n} \cdot mH_2O$ (Mg—Fe type) that has $Mg^{2+}$ which is the divalent metal ion ($M^{2+}$) and has $Fe^{3+}$ which is the trivalent metal ion ($M^{3+}$), or $Fe^{2+}_{1-x}Fe^{3+}_x(OH)_2(A^{n-})_{x/n} \cdot mH_2O$ (Fe—Fe type) that has $Fe^{2+}$ which is the divalent metal ion ($M^{2+}$), and has $Fe^{3+}$ which is the trivalent metal ion ($M^{3+}$). Note that the Mg—Fe type is better than the Mg—Al type since the arsenic adsorption effect is higher, the specific weight is higher which facilitates precipitation separation, and The cost suppression is higher.

In addition, the layered double hydroxide according to the present invention has a crystallite size which is preferably equal to or smaller than 20 nm, and more preferably equal to or smaller than 10 nm. In addition, it is preferable that the average crystalline size should be equal to or smaller than 10 nm.

The specific surface area of the layered double hydroxide according to the present disclosure is not limited to any particular size, but may be equal to or greater than 20 m$^2$/g in the BET scheme, more preferably, equal to or greater than 30 m$^2$/g, further more preferably, equal to or greater than 50 m$^2$/g, and still further more preferably, equal to or greater than 70 m$^2$/g. The upper limit of the specific surface area is not limited to any particular value. The specific surface area in the BET scheme is obtainable by, for example, measuring a nitrogen adsorption-desorption isothermal line using a specific-surface-area and pore-distribution measurement apparatus, and by creating a BET-plot based on the measurement result.

In addition, the layered double hydroxide according to the present disclosure may be a calcinated layered double hydroxide. Such a calcinated layered double hydroxide is obtainable by, for example, calcination of the layered double hydroxide at a temperature of equal to or higher than substantially 500° C.

Next, an explanation will be given of a method of producing the layered double hydroxide according to the present disclosure.

The layered double hydroxide is produced by mixing an acidic solution that contains the divalent metal ions and the trivalent metal ions with an alkaline solution. In this case, the mixture is deacidified within at least 120 minutes after the mixing, preferably, within 60 minutes after the mixing, and more preferably, simultaneously with the mixing.

For example, the layered double hydroxide that has a structural formula expressed as $Mg^{2+}_{1-x}Al^{3+}_x(OH)_2(A^{n-})_{x/n} \cdot mH_2O$ can be produced as follow.

First of all, an acidic solution that contains aluminum ions and magnesium ions is prepared.

An example aluminum source for aluminum ions may be one that produces aluminum ions within a solution, and is not limited to any particular substance. For example, alumina, aluminate soda, aluminum hydroxide, aluminum chloride, aluminum nitrate, bauxite, alumina produce residue from bauxite, and aluminum sludge are applicable. In addition, those aluminum sources may be applied in solo or in combination with at least two kinds.

An example magnesium source for magnesium ions may be one that produces magnesium ions within a solution, and is not limited to any particular substance. For example, brucite, magnesium hydroxide, magnesite, and calcined magnesite are applicable. Those magnesium sources may be applied in solo or in combination with at least two kinds.

The aluminum compound as the aluminum source, and the magnesium compound as the magnesium source do not need to be fully dissolved as long as the aluminum ions and magnesium ions are present in the acidic solution.

In addition, it is known that a high crystalline layered double hydroxide that is expressed as $Mg^{2+}_{1-x}Al^{3+}_{x}(OH)_z (A^{n-})_{x/n}\cdot mH_2O$ has the molar ratio of 1:3 (x=0.25) for the aluminum ions relative to the magnesium ions. Hence, it is preferable that the molar ratio in the acidic solution between the aluminum ions and the magnesium ions should be within the range between 1:5 and 1:2. By setting the molar ratio within this range, no aluminum source and magnesium source are wasted, and the layered double hydroxide can be produced excellently in view of material balance.

The acid contained in the acidic solution is not limited to any particular acid as long as it can make an aqueous solution acidic, but for example, nitric acid and hydrochloric acid are applicable.

Next, the acidic solution containing the aluminum ions and the magnesium ions is mixed with the alkaline solution at a predetermined ratio. Hence, the layered double hydroxide is produced. As for mixing, the acidic solution is added at once to the alkaline solution and mixed, the droplet of the acidic solution is added to the alkaline solution, or other schemes are applicable.

In this case, the alkali contained in the alkaline solution is not limited to any particular one as long as it can make an aqueous solution alkaline, but for example, sodium hydroxide, calcium hydroxide are applicable. In addition, sodium carbonate, potassium carbonate, ammonium carbonate, ammonia water, sodium borate, and potassium borate are applicable. Those may be applied in solo or in combination with at least two kinds. An applicable alkaline solution has pH adjusted to 8 to 14, and preferably, adjusted to 8 to 11.

The shorter the maturation time after the completion of mixing between the acidic solution and the alkaline solution is, the more the crystal growth is suppressed, enabling a production of the layered double hydroxide that has a small crystallite size, and the layered double hydroxide that has a large specific surface area.

An example scheme to stop the maturation is to decrease pH of a mixture solution after the completion of mixing between the acidic solution and the alkaline solution to a value that stops the crystal growth of the layered double hydroxide. In the case of, for example, the layered double hydroxide that has a structural formula expressed as $Mg^{2+}_{1-x}Al^{3+}_{x}(OH)_2(A^{n-})_{x/n}\cdot mH_2O$, it is preferable that pH should be equal to or smaller than 9. More specifically, within 120 minutes after the completion of the mixing between the acidic solution and the alkaline solution, preferably, within 60 minutes, and more preferably, simultaneously with the mixing, the mixture solution is diluted by water, and thus maturation is stopped. In addition, maturation can be stopped by eliminating moisture. In order to eliminate moisture, an appropriate separation, such as suctioning and filtering or centrifugal separation, which separates moisture from the layered double hydroxide is applied. In addition, in order to surely stop the maturation, after the completion of the mixing between the acidic solution and the alkaline solution, the layered double hydroxide may be immediately cleansed. Chloride like NaCl produced during the synthesis process may be left as it is.

The above explanation has been given of a case in which the acidic solution contains aluminum ions and magnesium ions, but the present disclosure is not limited to this example case, and the acidic solution may contain aluminum ions, while the alkaline solution may contain magnesium ions, the acidic solution may contain magnesium ions, while the alkaline solution may contain aluminum ions, or the alkaline solution may contain both the aluminum ions and the magnesium ions.

The layered double hydroxide that has a structural formula expressed as $Mg^{2+}_{1-x}Fe^{3+}_{x}(OH)_2(A^{n-})_{x/n}\cdot mH_2O$ can be produced as follow.

First, an acidic solution that contains iron ions and magnesium ions is prepared.

An iron source for iron ions is not limited any particular substance as long as it produces iron ions within a solution. For example, ferrous chloride is applicable. The iron source may be applied in solo or in combination with at least two kinds.

An example magnesium source for magnesium ions may be one that produces magnesium ions within a solution, and is not limited to any particular substance. For example, brucite, magnesium hydroxide, magnesite, and calcined magnesite are applicable. Those magnesium sources may be applied in solo or in combination with at least two kinds.

An iron compound as the iron source, and a magnesium compound as the magnesium source do not need to be fully dissolved as long as iron ions and magnesium ions are present in the acidic solution.

In addition, it is known that a high crystalline layered double hydroxide that is expressed as $Mg^{2+}_{1-x}Fe^{3+}_{x}(OH)_2 (A^{n-})_{x/n}\cdot mH_2O$ has the molar ratio of 1:3 (x=0.25) for the iron ions relative to the magnesium ions. Hence, it is preferable that the molar ratio in the acidic solution between the iron ions and the magnesium ions should be within the range between 1:5 and 1:2. By setting the molar ratio within this range, no iron source and magnesium source are wasted, and the layered double hydroxide can be produced excellently in view of material balance.

The acid contained in the acidic solution is not limited to any particular acid as long as it can make an aqueous solution acidic, but for example, nitric acid and hydrochloric acid are applicable.

Next, the acidic solution containing the iron ions and the magnesium ions is mixed with the alkaline solution at a predetermined ratio. Hence, the layered double hydroxide is produced. As for mixing, the acidic solution is added at once to the alkaline solution and mixed, the droplet of the acidic solution is added to the alkaline solution, or other schemes are applicable.

In this case, the alkali contained in the alkaline solution is not limited to any particular one as long as it can make an aqueous solution alkaline, but for example, sodium hydroxide, calcium hydroxide are applicable. In addition, sodium carbonate, potassium carbonate, ammonium carbonate, ammonia water, sodium borate, and potassium borate are applicable. Those may be applied in solo or in combination with at least two kinds. An applicable alkaline solution has pH adjusted to 8 to 14, and preferably, adjusted to 8 to 11.

The shorter the maturation time after the completion of mixing between the acidic solution and the alkaline solution is, the more the crystal growth is suppressed, enabling a production of the layered double hydroxide that has a small crystallite size, and the layered double hydroxide that has a large specific surface area.

An example scheme to stop the maturation is to decrease pH of a mixture solution after the completion of mixing between the acidic solution and the alkaline solution to a value that stops the crystal growth of the layered double hydroxide. In the case of, for example, the layered double hydroxide that has a structural formula expressed as $Mg^{2+}_{1-x}Fe^{3+}_{x}(OH)_2(A''^-)_{x/n} \cdot mH_2O$, it is preferable that pH should be equal to or smaller than 9. More specifically, within 120 minutes after the completion of the mixing between the acidic solution and the alkaline solution, preferably, within 60 minutes, and more preferably, simultaneously with the mixing, the mixture solution is diluted by water, and thus maturation is stopped. In addition, maturation can be stopped by eliminating moisture. In order to eliminate moisture, an appropriate separation, such as suctioning and filtering or centrifugal separation, which separates moisture from the layered double hydroxide is applied. In addition, in order to surely stop the maturation, after the completion of the mixing between the acidic solution and the alkaline solution, the layered double hydroxide may be immediately cleansed. Chloride like NaCl produced during the synthesis process may be left as it is.

The above explanation has been given of a case in which the acidic solution contains iron ions and magnesium ions, but the present disclosure is not limited to this example case, and the acidic solution may contain iron ions, while the alkaline solution may contain magnesium ions, the acidic solution may contain magnesium ions, while the alkaline solution may contain iron ions, or the alkaline solution may contain both the iron ions and the magnesium ions.

The layered double hydroxide immediately after moisture is eliminated as explained above is in a gel form. The layered double hydroxide of the present disclosure may be in a gel form, or may be dried to obtain powders or grains thereof. The layered double hydroxide in the grain form has a stable form, and facilitates handling, thus excellent in comparison with the powder form.

The layered double hydroxide grain according to the present disclosure is produced by applying a predetermined pressure, e.g., a pressure equal to or higher than 0.9 MPa to a material that contains the layered double hydroxide and water until the water content ratio becomes equal to or lower than 70% to eliminate moisture, and by drying the resultant under a condition in which the temperature is equal to or higher than 90° C. but equal to or lower than 110° C., and the humidity is equal to or higher than 90%. This gran is produced through, for example, the following method.

First, a predetermined pressure, e.g., a pressure equal to or higher than 0.9 MPa is applied to the layered double hydroxide that contains a large amount of moisture and produced through the above method of producing the layered double hydroxide according to the present disclosure using a dewatering device like a filter press, and moisture is eliminated as much as possible. Next, this layered double hydroxide is dried at a temperature that is equal to or lower than the dewatering temperature. In other words, only the water out of the crystal of the layered double hydroxide is dried out. More specifically, the layered double hydroxide to which the predetermined pressure is applied is dried so as to accomplish the water content ratio of equal to or lower than 70%, preferably, equal to or lower than 65%, and more preferably, equal to or lower than 60% to obtain the grain of the layered double hydroxide that is a final product having the water content ratio of equal to or higher than 10% but equal to or lower than 20%, preferably, equal to or higher than 10% but equal to or lower than 15%, and more preferably, equal to or higher than 11% but equal to or lower than 12%. The reason why the water content ratio of the layered double hydroxide grain is maintained to be equal to or higher than 10% is that when the water content ratio of the layered double hydroxide grain is less than 10%, the layered double hydroxide grain adsorbs moisture when in contact with a solution, etc., and remarkably increases the volume, which becomes out of the granularity. The term water content ratio is a mass of water relative to a mass of the entire layered double hydroxide that contains moisture. The measurement for the mass of moisture contained in the layered double hydroxide was performed in compliance with Japan Industry Standard "water content ratio test method of soil" (JIS A 1203: 1999).

The drying temperature is not limited to any particular temperature as long as it is equal to or lower than the dewatering temperature of the crystal water of the layered double hydroxide, but in order to increase the grain diameter of the layered double hydroxide grain, a drying process at a relatively low temperature is preferable. When, however, the drying process is performed at a quite low temperature, the layered double hydroxide grain is likely to be dissolved in water. Hence, it is preferable that a specific drying temperature should be equal to or higher than 25° C. but equal to or lower than 125° C., preferably, equal to or higher than 90° C. but equal to or lower than 110° C., and more preferably, equal to or higher than 95° C. but equal to or lower than 105° C.

This drying process may be performed in any way, and for example, a normal drying furnace may be applied. Needless to say, natural drying at a room temperature is also applicable. In addition, when the humidity at the time of drying is adjusted so as to be high, the form stability of the layered double hydroxide grain becomes better. For example, the amount of vapor in the drying furnace may be adjusted so as to be around the saturated vapor amount (where the humidity is 90 to 100%).

In addition, the layered double hydroxide grains dried as explained above may be screened to eliminate precipitated chlorides, etc.

Still further, the layered double hydroxide grain may have a grain diameter adjustment in accordance with an application. In this case, it is preferable that the grain diameter should be equal to or greater than, for example, 0.24 mm, preferably, equal to or greater than 0.36 mm, and more preferably, equal to or greater than 1 mm but equal to or smaller than 2 mm. The adjustment process of the grain diameter may be performed in any way, and for example, the layered double hydroxide may be crushed by a hammer, etc., and may be screened by a screen which has a grid that is in a target grain size.

Next, an explanation will be given of a layered double hydroxide compact according to the present disclosure.

The layered double hydroxide compact according to the present disclosure is formed from the above layered double hydroxide. For example, the compact can be produced by forming and processing powder or grains of the layered double hydroxide through a desired method such as binding or pressurization.

Next, an explanation will be given of a water purification apparatus according to the present disclosure.

A water purification apparatus 100 of the present invention mainly includes a polluted substance remover 1 that removes a polluted substance contained in polluted water 9 by the layered double hydroxide, and a solid-liquid separator 2 that separates the polluted water 9 and a solid material from each other.

In this case, example polluted substances are arsenic, fluorine, selenium, hexavalent chrome, nitrous acid ions, and other anion-based hazardous substances, and further cationbased hazardous substances, such as cadmium and zinc. The term polluted water means water polluted by such a hazardous substance.

The polluted substance remover 1 removes the polluted substances contained in the polluted water 9 using a layered double hydroxide (polluted substance removing step).

The layered double hydroxide is selected as appropriate from the powders of the layered double hydroxide, the layered double hydroxide compact, or the grains of the layered double hydroxide in accordance with an application.

The polluted substance remover 1 may have a filter material that can remove a component which is not absorbed by the layered double hydroxide. Thus, if a polluted substance removal assistance step is performed to remove the component which is not adsorbed to the layered double hydroxide at least either before or after the polluted substance removing step, a removal of the component which is not adsorbed to the layered double hydroxide and a deodorization can be expected. For example, as the filter material, activated charcoal and anthracite can be used.

Moreover, the water purification apparatus 100 of the present invention includes the solid-liquid separator 2 that separates the polluted water 9 and the solid material from each other. In this case, first, the polluted water 9 is initially supplied to the solid-liquid separator 2, the polluted water 9 and the solid material are separated from each other (solid-liquid separation step), and thereafter, water which has passed through the solid-liquid separator 2 is supplied to the layered double hydroxide of the polluted substance remover 1 (polluted water supplying step). In addition, the polluted substance contained in the polluted water supplied in the polluted water supplying step is removed by the layered double hydroxide in the above-described polluted substance removing step.

The solid materials to be removed by the solid-liquid separator 2 are not limited to any particular ones, but it is preferable that the solid materials that decrease the polluted substance adsorption performance of the polluted substance remover 1 and the layered double hydroxide disposed therein should be removed. For example, when well water is exposed in air, this water is oxidized, thus becoming rust water, and since the coprecipitate of iron and arsenic contained in this rust water decreases the performance of the polluted substance remover 1, it is preferable that such a coprecipitate should be removed at the prior stage to the polluted substance remover 1.

The solid-liquid separator 2 is preferably a filtration filter that has a function as a catalyst which precipitates at least one of iron, arsenic, and manganese from the polluted water 9. Because of this catalyst function, the solid-liquid separator 2 can effectively remove substances that decrease the polluted substance adsorption performance by the layered double hydroxide, and thus the polluted substance remover 1 can effectively remove the polluted substances. Example filtration filters are inorganic filters like a ceramic filter, a polypropylene filter, and a paper filter. In this case, as for the filter structure, a depth filter (depth filtration) like a string wound filter and a resin-made filter, and a surface filter (surface filtration) like a pleated filter and a membrane filter are applicable.

The water purification apparatus 100 according to the present disclosure may change the structure in accordance with the kind of polluted water. When, for example, rust water is to be purified, the water purification apparatus may include the polluted substance remover 1 and the solid-liquid separator 2. Hence, after sludges are removed by the solid-liquid separator 2, the polluted substance remover 1 removes the polluted substances, and thus an excellent polluted substance removal effect is accomplished. Conversely, when polluted water that contains no solid materials like rusts is to be purified, the water purification apparatus may include the polluted substance remover 1 only.

EXAMPLES

Examples for the layered double hydroxide grain and the method of producing the same according to the present disclosure will be explained below, but the present disclosure is not limited to those examples. The layered double hydroxide grain according to the examples can be produced through the substantially same method as explained above, and thus the redundant explanation for the similar part will be omitted below.

First Example (Crystallite Size)

Three types of layered double hydroxides 1 to 3 formed by different production methods were prepared, an X-ray diffraction measurement was performed thereon, and a crystallite size was calculated through a Scherrer equation. Table 1 shows the results.

TABLE 1

| Layered double hydroxide | Crystallite size (nm) |
|---|---|
| Layered double hydroxide 1 (commercially available layered double hydroxide/Mg—Al type) | 22.8 |
| Layered double hydroxide 2 (layered double hydroxide of present disclosure/Mg—Al type) | 9.2 |
| Layered double hydroxide 3 (layered double hydroxide of present disclosure/Mg—Fe type) | 7.7 |

The following are the details of the respective layered double hydroxides 1 to 3.

(1) Layered Double Hydroxide 1

A layered double hydroxide available from WAKO Pure Chemical Industries, Ltd., (production code: 324-87435) was applied as the layered double hydroxide 1.

(2) Layered Double Hydroxide 2

First, magnesium chloride hexahydrate (available from WAKO Pure Chemical Industries, Ltd.) of 16.92 g and aluminum chloride hexahydrate (available from WAKO Pure Chemical Industries, Ltd.) of 10.06 g were dissolved in a distilled water of 26.98 g to prepare an acidic solution. In addition, sodium hydroxide (available from WAKO Pure Chemical Industries, Ltd.) of 10 g was dissolved in a distilled water of 30 g, and an alkaline solution was prepared. Next, the acidic solution and the alkaline solution were mixed, and a distilled water of 281.85 g was quickly added to the mixture solution without taking time, and pH was adjusted to 7.5 to 8.5. Subsequently, this solution was filtered, and the obtained filtrated material was dried for 10 hours at the temperature of 120° C. to obtain the layered double hydroxide 2.

(3) Layered Double Hydroxide 3

First, magnesium chloride hexahydrate (available from WAKO Pure Chemical Industries, Ltd.) of 15.10 g and iron chloride hexahydrate (available from WAKO Pure Chemical Industries, Ltd.) of 10.06 g were dissolved in a distilled water of 25.16 g to prepare an acidic solution. In addition, sodium hydroxide (available from WAKO Pure Chemical Industries, Ltd.) of 8.9 g was dissolved in a distilled water of 14.28 g, and an alkaline solution was prepared. Next, the acidic solution and the alkaline solution were mixed, and a distilled water of 258.0 g was quickly added to the mixture solution without taking time, and pH was adjusted to 7.5 to 8.5. Subsequently, this solution was filtered, and the obtained filtrated material was dried for 10 hours at the temperature of 120° C. to obtain the layered double hydroxide 3.

Second Example (Specific Surface Area)

As for the layered double hydroxides 1 to 3, respective specific surface areas were measured. As for the measurement of the specific surface area, nitrogen gas was adsorbed by the surface of the powders and grains of the respective layered double hydroxides at a temperature of liquid nitrogen (−196° C.), and the specific surface area was calculate through BET scheme based on the adsorption amount. Table 2 shows the results.

TABLE 2

| Layered double hydroxide | BET Specific Surface Area ($m^2/g$) |
|---|---|
| Layered double hydroxide 1 (commercially available layered double hydroxide/Mg—Al type) | 18.2 |
| Layered double hydroxide 2 (layered double hydroxide of present disclosure/Mg—Al type) | 70.1 |
| Layered double hydroxide 3 (layered double hydroxide of present disclosure/Mg—Fe type) | 31.4 |

As is clear from the results, it is confirmed that the layered double hydroxide of the present disclosure has a larger specific surface area than that of commercially available products.

Third Example (Adsorption Performance Evaluation)

In order to check the adsorption performance of the layered double hydroxide according to the present disclosure relative to various kinds of ions, an isothermal adsorption test was carried out. The test was carried out through the following method under a condition at which the temperature was a constant temperature (set temperature: 20° C.), and a water temperature was 20° C.

First, a test reagent was weighed for each target ion, and was dissolved in an ion-exchange water of 1 L to produce each ion reference solution, and this reference solution was diluted to prepare a reaction solution of 100 mL that had an adjusted concentration. Next, the layered double hydroxide of the present disclosure (the above layered double hydroxide 2 or layered double hydroxide 3) that was 1 g was added to each reaction solution, stirred for 1 hour by a magnetic stirrer, and then filtrated using a filter paper (5B). The concentration of each filtrated solution (reaction solution) was measured by ICP after diluted within a measurable range.

Figure 1:
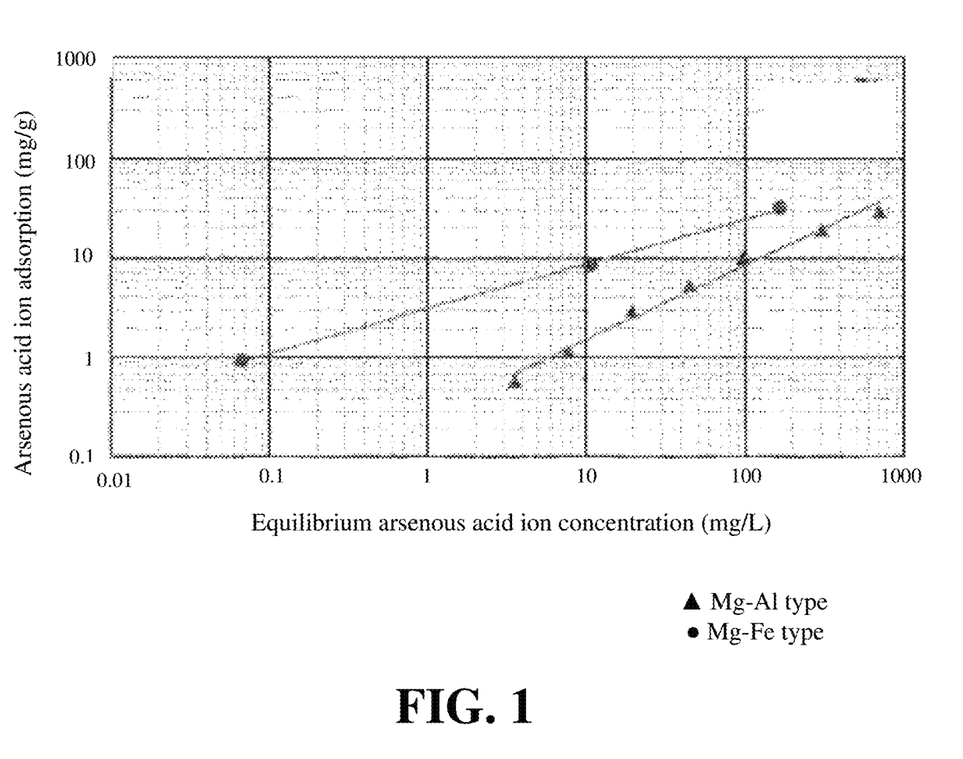
FIG. 1 is a graph illustrating an adsorption isothermal line of a layered double hydroxide relative to arsenous acid ions according to the present disclosure.

Table 3 and table 4 show the test results for arsenous acid ion ($AsO(OH)_2^-$). Table 3 shows the adsorption test result by the layered double hydroxide 2 (Mg—Al type), and table 4 shows the adsorption test result by the layered double hydroxide 3 (Mg—Fe type). In addition, an adsorption isothermal line obtained from those pieces of data is illustrated in FIG. 1.

TABLE 3

| Initial concentration and pH | | | Balanced concentration and pH | | | Adsorption amount | |
|---|---|---|---|---|---|---|---|
| mg/L | mmol/L | pH | mg/L | mmol/L | pH | mg/g | mmol/g |
| 9.48 | 0.127 | 5.71 | 3.58 | $4.78 \times 10^{-2}$ | 8.8 | 0.59 | $7.88 \times 10^{-3}$ |
| 19.6 | 0.262 | 5.62 | 7.75 | 0.103 | 8.62 | 1.18 | $1.58 \times 10^{-2}$ |
| 49.2 | 0.657 | 5.54 | 19.8 | 0.264 | 8.69 | 2.94 | $3.92 \times 10^{-2}$ |
| 98 | 1.31 | 5.45 | 45.3 | 0.604 | 8.65 | 5.27 | $7.04 \times 10^{-2}$ |
| 197 | 2.64 | 5.25 | 97.3 | 1.3 | 8.56 | 10 | 0.134 |
| 498 | 6.64 | 5.02 | 304 | 4.05 | 8.21 | 19.4 | 0.259 |
| $1.00 \times 10^3$ | 13.3 | 4.57 | 708 | 9.45 | 7.53 | 29.2 | 0.39 |

TABLE 4

| Initial concentration and pH | | | Balanced concentration and pH | | | Adsorption amount | |
|---|---|---|---|---|---|---|---|
| mg/L | mmol/L | pH | mg/L | mmol/L | pH | mg/g | mmol/g |
| 9.632 | 0.129 | 4.75 | 0.067 | $8.94 \times 10^{-4}$ | 9.11 | 0.9565 | $1.28 \times 10^{-2}$ |
| 95.464 | 1.274 | 3.74 | 10.664 | 0.142 | 8.86 | 8.48 | 0.113 |
| 477.107 | 6.368 | 3.11 | 165.005 | 2.202 | 8.54 | 31.2102 | 0.417 |

Figure 2:
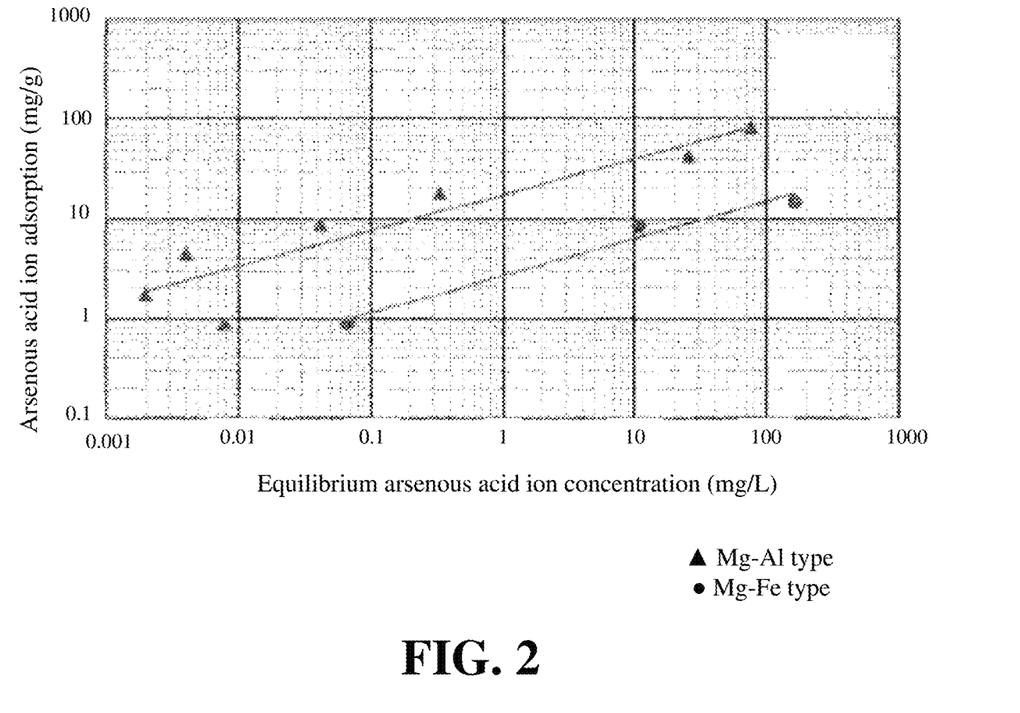
FIG. 2 is a graph illustrating an adsorption isothermal line of the layered double hydroxide relative to arsenic acid ions according to the present disclosure.

Table 5 and table 6 show test results for arsenic acid ions ($H_2AsO_4^-$). Table 5 shows an adsorption test result by the layered double hydroxide 2 (Mg—Al type), and table 6 shows an adsorption test result by the layered double hydroxide 3 (Mg—Fe type). In addition, FIG. 2 illustrates an adsorption isothermal temperature line obtained from those pieces of data.

TABLE 5

| Initial concentration and pH | | | Balanced concentration and pH | | | Adsorption amount | |
|---|---|---|---|---|---|---|---|
| mg/L | mmol/L | pH | mg/L | mmol/L | pH | mg/g | mmol/g |
| 8.86 | 0.118 | 5.19 | 0.008 | $1.04 \times 10^{-4}$ | 8.7 | 0.885 | $1.18 \times 10^{-2}$ |
| 17.8 | 0.238 | 5.08 | 0.002 | $3.12 \times 10^{-5}$ | 8.67 | 1.78 | $2.38 \times 10^{-2}$ |
| 44.1 | 0.588 | 4.78 | 0.004 | $5.69 \times 10^{-5}$ | 8.19 | 4.4 | $5.88 \times 10^{-2}$ |
| 89.7 | 1.2 | 4.64 | 0.042 | $5.63 \times 10^{-4}$ | 8.12 | 8.97 | 0.12 |
| 179 | 2.39 | 4.45 | 0.341 | $4.55 \times 10^{-3}$ | 8.17 | 17.9 | 0.239 |
| 445 | 5.93 | 4.25 | 25.6 | 0.342 | 7.66 | 41.9 | 0.559 |
| 910 | 12.1 | 4.15 | 75.6 | 1.01 | 7.31 | 83.4 | 1.11 |

TABLE 6

| Initial concentration and pH | | | Balanced concentration and pH | | | Adsorption amount | |
|---|---|---|---|---|---|---|---|
| mg/L | mmol/L | pH | mg/L | mmol/L | pH | mg/g | mmol/g |
| 8.905 | 0.119 | 7.21 | 0.002 | $2.67 \times 10^{-5}$ | 9.31 | 0.8903 | $1.19 \times 10^{-2}$ |
| 88.258 | 1.178 | 7.85 | 2.328 | $3.11 \times 10^{-2}$ | 9.45 | 8.593 | 0.115 |
| 445.162 | 5.942 | 8.76 | 295.765 | 3.948 | 9.52 | 14.9397 | 0.199 |

Based on the isothermal adsorption test results, it is confirmed that the layered double hydroxide according to the present disclosure shows adsorption characteristics (unillustrated) to various kinds of ions, and shows remarkable adsorption characteristics to arsenous acid ions and arsenic acid ions (see FIG. 1 and FIG. 2). In addition, it is confirmed that the layered double hydroxide according to the present disclosure shows better adsorption characteristics than those of commercially available layered double hydroxide that has a larger crystallite size (unillustrated). Still further, it is confirmed that under the test condition of the third example, the Mg—Fe type has a greater adsorption performance than that of the Mg—Al type for arsenous acid ions (see FIG. 1).

Fourth Example (Comparison on Adsorption Performance)

In order to clarify a difference in arsenic adsorption performance between the layered double hydroxide 2 (Mg—Al type) and the layered double hydroxide 3 (Mg—Fe type), an isothermal adsorption test was carried out at a constant initial concentration. The test was carried out in accordance with the method of the third example, and the addition amount of the layered double hydroxide was set to 0.5 g.

Table 7 shows an adsorption test result for arsenous acid ions ($AsO(OH)_2^-$), while table 8 shows an adsorption result for arsenic acid ions ($H_2AsO_4^-$).

TABLE 7

| | Initial concentration and pH | | | Balanced concentration and pH | | | Adsorption amount | |
|---|---|---|---|---|---|---|---|---|
| | µg/L | µmol/L | pH | µg/L | µmol/L | pH | µg/g | mmol/g |
| Layered double hydroxide 2 (Mg—Al type) | 103.528 | 1.382 | 5.48 | 21.239 | 0.283 | 8.91 | 164.578 | $2.197 \times 10^{-3}$ |
| Layered double hydroxide 3 (Mg—Fe type) | | | | 2.011 | 0.027 | 9.26 | 203.034 | $2.71 \times 10^{-3}$ |

TABLE 8

| | Initial concentration and Ph | | | Balanced concentration and pH | | | Adsorption amount | |
|---|---|---|---|---|---|---|---|---|
| | µg/L | µmol/L | pH | µg/L | µmol/L | pH | µg/g | mmol/g |
| Layered double hydroxide 2 (Mg—Al type) | 99.989 | 1.335 | 5.78 | 2.677 | 0.036 | 8.91 | 194.624 | $2.598 \times 10^{-3}$ |

TABLE 8-continued

| | Initial concentration and Ph | | | Balanced concentration and pH | | | Adsorption amount | |
|---|---|---|---|---|---|---|---|---|
| | µg/L | µmol/L | pH | µg/L | µmol/L | pH | µg/g | mmol/g |
| Layered double hydroxide 3 (Mg—Fe type) | | | | 1.693 | 0.023 | 9.16 | 196.592 | $2.624 \times 10^{-3}$ |

Based on those results, it is confirmed that the layered double hydroxide according to the present disclosure shows a remarkable adsorption performance for arsenous acid ions and arsenic acid ions in low concentration (in a ppb order). In this case, it is confirmed that the Mg—Fe type layered double hydroxide shows a higher adsorption performance than that of the Mg—Al type, and the difference in adsorption performance is quite remarkable in adsorption of arsenous acid ions.

Figure 3:
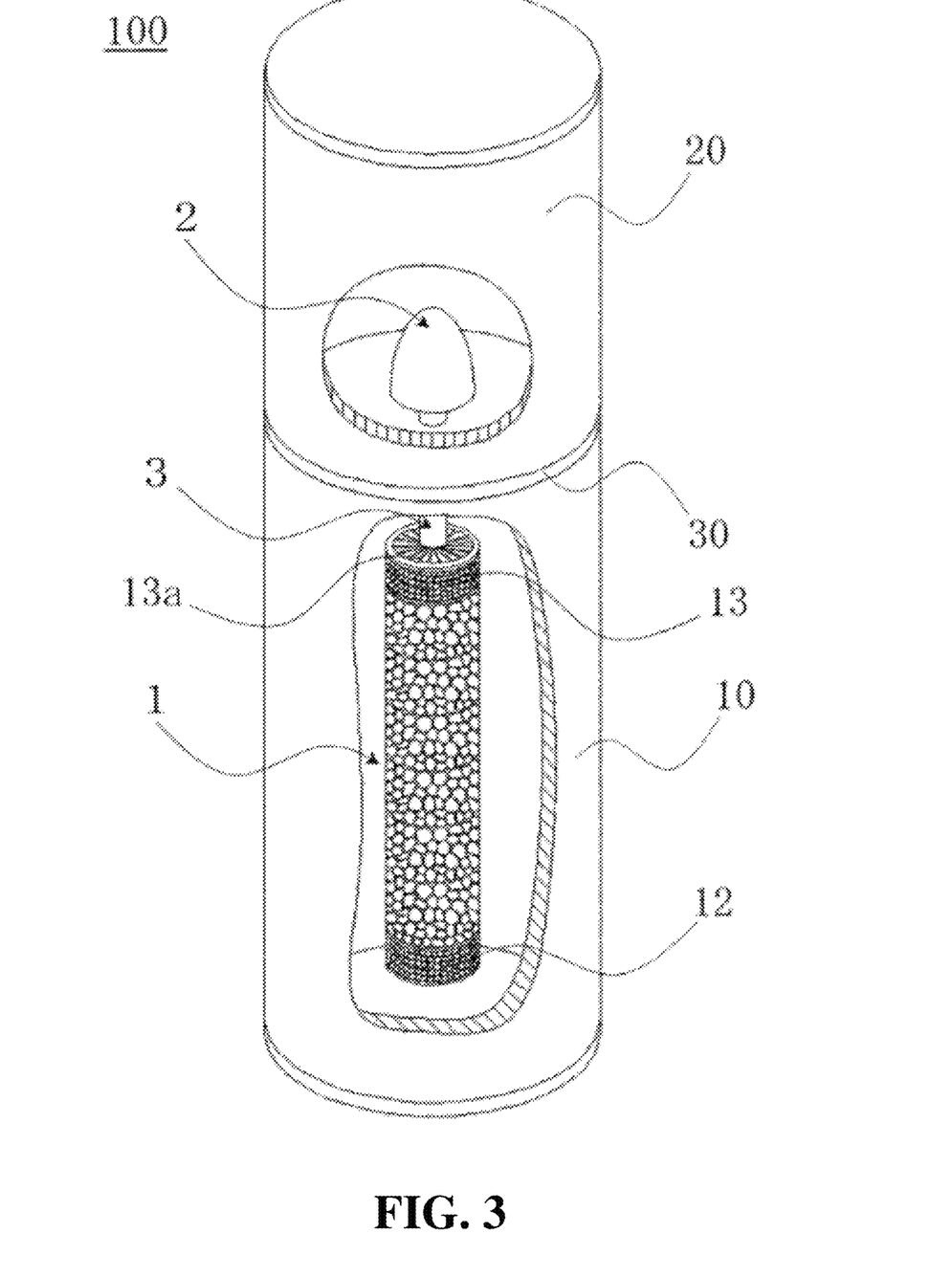
FIG. 3 is a schematic perspective view illustrating a water purification apparatus according to the present disclosure.
Figure 4:
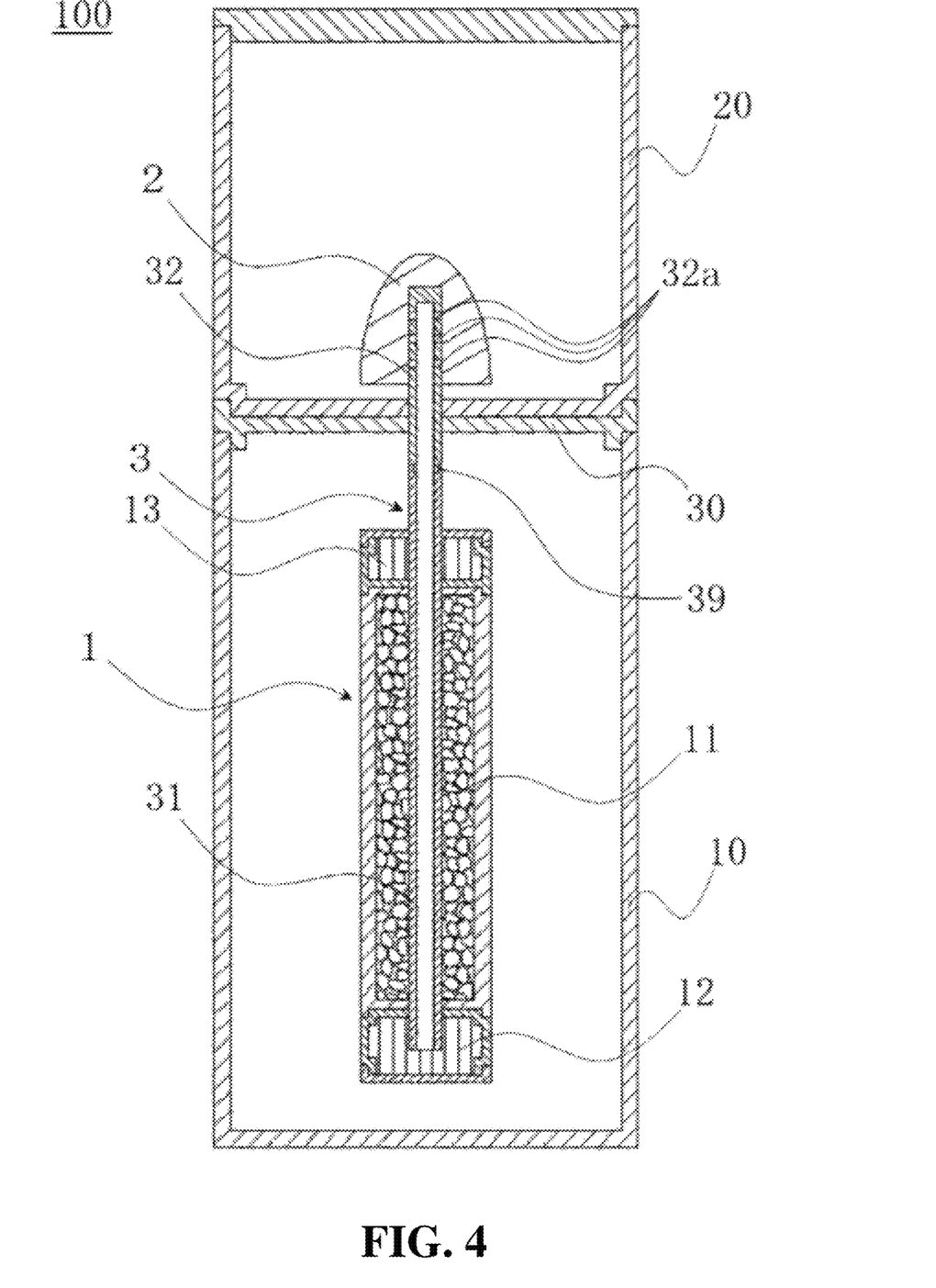
FIG. 4 is a schematic cross-sectional view illustrating the water purification apparatus according to the present disclosure.

Next, an explanation will be given of an example water purification apparatus 100 according to the present disclosure with reference to FIG. 3 and FIG. 4. However, the water purification apparatus according to the present disclosure is not limited to this example.

The water purification apparatus 100 is to remove polluted substances from polluted water, and mainly includes the polluted substance remover 1, the solid-liquid separator 2, a communication pipe 3 that causes the polluted substance remover 1 to be in communication with the solid-liquid separator 2, a lower container 10 in which the polluted substance remover 1 is disposed, an upper container 20 in which the solid-liquid separator 2 is disposed, and a lid 30 that couples the upper container 20 and the lower container 10.

The polluted substance remover 1 is to remove polluted substances from polluted water by at least the layered double hydroxide. The form of the layered double hydroxide may be powder, grain, or compact in accordance with an application. The polluted substance remover 1 illustrated in FIG. 3 includes a layered-double-hydroxide filter 11 in which the layered double hydroxide grains are contained, and further a lower active charcoal filter 12 in which an active charcoal is contained, and an upper active charcoal filter 13 in which an active charcoal is also contained.

The lower container 10 is to retain water that has passed through the polluted substance remover 1. The lower container 10 includes, although it is not illustrated, opening and closing means for supplying the retained water to the exterior like a faucet.

In addition, depending on the polluted water, sludges that are precipitates of iron and manganese are contained. When the sludges are accumulated within the polluted substance remover 1, the polluted substance removal performance by the polluted substance remover decreases. Hence, the water purification apparatus 100 may include the solid-liquid separator 2 that separates, from polluted water, solid materials like sludges, in particular, solid materials that decrease the polluted substance adsorption performance of the layered double hydroxide. In addition, it is preferable that the solid-liquid separator 2 should be a filtration filter that has a function as a catalyst which precipitates ions that are the sources of the sludges like iron and manganese, and polluted substance ions like arsenic as solid materials. For example, a ceramic filter formed in a hollow cylindrical shape, etc., is applicable.

The communication pipe 3 is to couple the polluted substance remover 1 with the solid-liquid separator 2. For example, as illustrated in FIG. 4, the communication pipe 3 includes a lower communication pipe 31 coupled to the polluted substance remover 1, and an upper communication pipe 32 coupled to the solid-liquid separator 2, and the lower communication pipe 31 and the upper communication pipe 32 can be coupled with each other. An example coupling part 39 between the lower communication pipe 31 and the upper communication pipe 32 is a pair of male screw and female screw.

The upper communication pipe 32 has multiple orifices 32a at a tip, and such a tip is fitted in the center of the filtration filter of the solid-liquid separator 2. Hence, the filtrated water that has passed through the filtration filter flows in the communication pipe 3 via the orifices 32a.

The layered-double-hydroxide filter 11 is formed in a shape like a container in which the layered double hydroxide is contained, and is formed with an opening in which the lower communication pipe 31 can be fitted in a sealed condition via a sealer like an O-ring at the center of the upper surface of that container and that of the lower surface thereof. In addition, the upper surface of the container and the lower surface thereof are formed with communication holes (unillustrated) in a size which do not allow the layered double hydroxide to pass through, but which allows only water to pass through. The communication hole may be a circular hole or a slit. The upper surface of the container and the lower surface thereof may be formed as an openable and closable lid for a replacement of the internal layered double hydroxide.

In addition, like the layered-double-hydroxide filter 11, the upper active charcoal filter 13 is formed in a shape like a container in which an active charcoal is contained, and is formed with an opening in which the lower communication pipe 31 can be fitted in a sealed condition via a sealer like an O-ring at the center of the upper surface of the container and that of the lower surface thereof. In addition, the upper surface of the container and the lower surface thereof are formed with communication holes 13a in a size which do not allow the active charcoal to pass through, but which allows only water to pass through. The communication hole 13a may be a circular hole or a slit. The upper surface of the container and the lower surface thereof may be formed as an openable and closable lid for a replacement of the active charcoal.

Still further, the lower active charcoal filter 12 is formed in a shape like a container in which an active charcoal is contained, and is formed with an opening in which the lower communication pipe 31 can be fitted in a sealed condition via a sealer like an O-ring at the center of the upper surface of the container and that of the lower surface thereof. In addition, the upper surface of the container and the lower surface thereof are formed with communication holes (unillustrated) in a size which do not allow the active charcoal to pass through, but which allows only water to pass through. The communication hole may be a circular hole or a slit. The upper surface of the container and the lower surface thereof may be formed as an openable and closable lid for a replacement of the active charcoal.

Formed at the upper end of the layered-double-hydroxide filter 11 and the lower end of the upper active charcoal filter 13, and at the lower end of the layered-double-hydroxide filter 11 and at the upper end of the lower active charcoal filter 12 are, for example, respective pairs of male screw and female screw. Those serve as a coupling part to couple the respective filters with each other.

Next, how to apply the water purification apparatus 100 employing the above structure will be explained.

First, the polluted water is supplied to the upper container 20. In this case, the polluted water is filtrated when passing through the solid-liquid separator 2, and the solid materials like sludges are removed. Depending on the kind of the filter applied to the solid-liquid separator 2, at this time, ions that are the sources of sludges like iron and manganese, and polluted substance ions like arsenic are precipitated as solid materials, and such solid materials are also removed. The polluted water from which the solid materials are removed flows in the communication pipe 3 via the orifices 32a of the upper communication pipe 32.

The polluted water flowing in the communication pipe 3 flows in the lower active charcoal filter 12 from the lower end side of the pipe. The lower active charcoal filter 12 removes iron, manganese, and arsenic, etc., contained in the polluted water. The polluted water that has passed through the lower active charcoal filter 12 passes through the communication holes located in the upper surface of the lower active charcoal filter 12, and flows in the layered-double-hydroxide filter 11.

The layered-double-hydroxide filter 11 removes the polluted substances like arsenic contained in polluted water. The water that has passed through the layered-double-hydroxide filter 11 passes through the communication holes located in the upper surface of the layered-double-hydroxide filter 11, and flows in the upper active charcoal filter 13.

The upper active charcoal filter 13 removes iron, manganese, and arsenic, etc., contained in the water. The water that has passed through the upper active charcoal filter 13 passes through the communication holes 13a located in the upper surface of the upper active charcoal filter 13, and is retained in the lower container 10. The purified water retained in the lower container 10 may be taken out via the opening and closing means like a faucet, or may be taken out by detaching the lid 30 of the lower container 10.

In the above explanation, although the communication pipe 3 is connected to the lower active charcoal filter 12 of the polluted substance remover 1, and the polluted water is caused to flow through the lower active charcoal filter 12, the layered-double-hydroxide filter 11, and the upper active charcoal filter 13 in this sequence, the present disclosure is not limited to this structure. The communication pipe 3 may be connected to the upper active charcoal filter 13 of the polluted substance remover 1, and the polluted water may be caused to flow through the upper active charcoal filter 13, the layered-double-hydroxide filter 11, and the lower active charcoal filter 12 in this sequence.

Next, table 9 shows a water purification result of well water in Bangladesh using the water purification apparatus according to the present disclosure. A ceramic filter was applied to the solid-liquid separator 2, and only grains of the layered double hydroxide 2 (Mg—Al type) were applied to the polluted substance remover 1 without an active charcoal filter at all.

TABLE 9

| | Arsenic (mg/L) | Iron (mg/L) | Manganese (mg/L) |
|---|---|---|---|
| Prior to Process (original water) | 0.48 | 8 | 0.16 |
| Concentration reference value in drinkable water (defined by Bangladesh) | 0.05 | 0.3-1.0 | 0.1 |
| Concentration recommended value in drinkable water (defined by WHO) | 0.01 | 0.3 | 0.1 |
| After process by solid-liquid separator | 0.38 | 0.1 | <MDL |
| After process by solid-liquid separator + polluted substance remover | 0.008 | 0.2 | <MDL |

It becomes clear that, by applying the water purification apparatus according to the present disclosure, respective concentrations of arsenic, iron, and manganese contained in well water of Bangladesh can be decreased to a quite low concentration level. In this case, it is confirmed that arsenic is effectively removed by the polluted substance remover, while iron and manganese are effectively removed by the solid-liquid separator. In addition, it is further confirmed that the respective concentrations of arsenic, iron and manganese after purification are remarkably below the respective concentration reference values for drinkable water defined in Bangladesh, and are also remarkably below the reference values defined by WHO.

The list of reference numbers used in the drawing figures is as follows.
   1 Polluted substance remover
   2 Solid-liquid separator
   3 Communication pipe
   10 Lower container
   11 Layered-double-hydroxide filter
   12 Active charcoal filter
   13 Active charcoal filter
   13a Communication hole
   20 Upper container
   30 Lid
   31 Lower communication pipe
   32 Upper communication pipe
   32a Orifice
   39 Coupling part
   100 Water purification apparatus

The invention claimed is:
1. A water purification apparatus for removing a polluted substance from polluted water, the water purification apparatus comprising:
   a solid-liquid separator that separates the polluted water and a solid material from each other;
   a polluted substance remover that removes, by a layered double hydroxide, the polluted substance contained in the polluted water separated by the solid-liquid separator;
   a communication pipe that couples the polluted substance remover with the solid-liquid separator, the communication pipe comprising multiple orifices, the polluted water separated by the solid-liquid separator flowing into the communication pipe via the multiple orifices; and
   a coupler that removably couples a first container in which the solid-liquid separator is disposed, and a second container in which the layered double hydroxide is disposed, wherein:

the communication pipe has a first portion connected to the solid-liquid separator and a second portion connected to the polluted substance remover, the first portion has a length contained within the solid-liquid separator;

the second portion has a length contained within the polluted substance remover; and the length of the second portion is longer than the length of the first portion.

2. The water purification apparatus according to claim 1, wherein the solid-liquid separator separates the solid material that decreases polluted substance adsorption performance of the layered double hydroxide.

3. The water purification apparatus according to claim 1, wherein the solid-liquid separator includes a filtration filter that has a function as a catalyst which precipitates at least one of iron, arsenic, and manganese from the polluted water.

4. The water purification apparatus according to claim 1, wherein the solid-liquid separator is a ceramic filter or a polypropylene filter.

5. The water purification apparatus according to claim 1, wherein the polluted substance is arsenic, and the polluted substance remover removes the arsenic.

6. The water purification apparatus according to claim 1, wherein the layered double hydroxide is a grain that is produced by applying a predetermined pressure to a material containing the layered double hydroxide and water to eliminate moisture until a water content ratio becomes equal to or lower than 70%, and thereafter, drying the material under a condition at which a temperature is equal to or higher than 90° C. but equal to or lower than 110° C., and a humidity is equal to or higher than 90%.

7. The water purification apparatus according to claim 6, wherein the grain has the water content ratio that is equal to or higher than 10%.

8. The water purification apparatus according to claim 6, wherein a diameter of the grain is equal to or greater than 0.24 mm.

9. The water purification apparatus according to claim 1, wherein the layered double hydroxide is a compact obtained by molding a layered double hydroxide.

10. The water purification apparatus according to claim 1, wherein the layered double hydroxide has a general expression that is expressed as $M^{2+}_{1-x}M^{3+}_x(OH)_2(A^{n-})_{x/n} \cdot mH_2O$ (where $M^{2+}$ is $Mg^{2+}$ or $Fe^{2+}$, $M^{3+}$ is $Al^{3+}$ or $Fe^{3+}$, $A^{n-}$ is an n-valence anion, $0<x<1$, and $m>0$).

11. The water purification apparatus according to claim 1, wherein the layered double hydroxide has a crystallite size of equal to or smaller than 20 nm.

12. The water purification apparatus according to claim 1, the polluted substance remover has a filter material that removes a component which is not absorbed by the layered double hydroxide.

13. A water purification apparatus for removing one or more polluting substances from water, the water purification apparatus comprising:

a solid-liquid separator receiving first water that is polluted, separating solid material out of the first water, and outputting second water that is cleaner than the first water;

a polluted substance remover comprising a first charcoal filter, a second charcoal filter, and a layered double hydroxide filter;

a communication pipe extending to conduct the second water to the first charcoal filter, wherein:

the first charcoal filter receives the second water from the communication pipe, removes at least a first portion of the one or more polluting substances from the second water, and outputs third water that is cleaner than the second water, the layered double hydroxide filter receives the third water from the first charcoal filter, removes at least a second portion of the one or more polluting substances from the third water, and outputs fourth water that is cleaner than the third water, and a second charcoal filter receives the fourth water from the layered double hydroxide filter, removes at least a third portion of the one or more polluting substances from the fourth water, and outputs fifth water that is cleaner than the fourth water; and a coupler that removably couples a first container in which the solid-liquid separator is disposed, and a second container in which the layered double hydroxide filter is disposed, wherein: the communication pipe has a first portion connected to the solid-liquid separator and a second portion connected to the polluted substance remover, the first portion has a length contained within the solid-liquid separator;

the second portion has a length contained within the polluted substance remover; and the length of the second portion is longer than the length of the first portion.

14. The water purification apparatus of claim 13, wherein the solid-liquid separator catalytically precipitates at least one of iron, arsenic, and manganese from the first water.

15. The water purification apparatus of claim 13, wherein the solid-liquid separator is positioned above the polluted substance remover.

16. The water purification apparatus of claim 15, wherein the communication pipe extends vertically to couple the solid-liquid separator to the first charcoal filter.

17. The water purification apparatus of claim 16, wherein the first charcoal filter is positioned below the layered double hydroxide filter.

18. The water purification apparatus of claim 17, wherein the layered double hydroxide filter is positioned vertically between the first charcoal filter and the second charcoal filter.

* * * * *